UNITED STATES PATENT OFFICE.

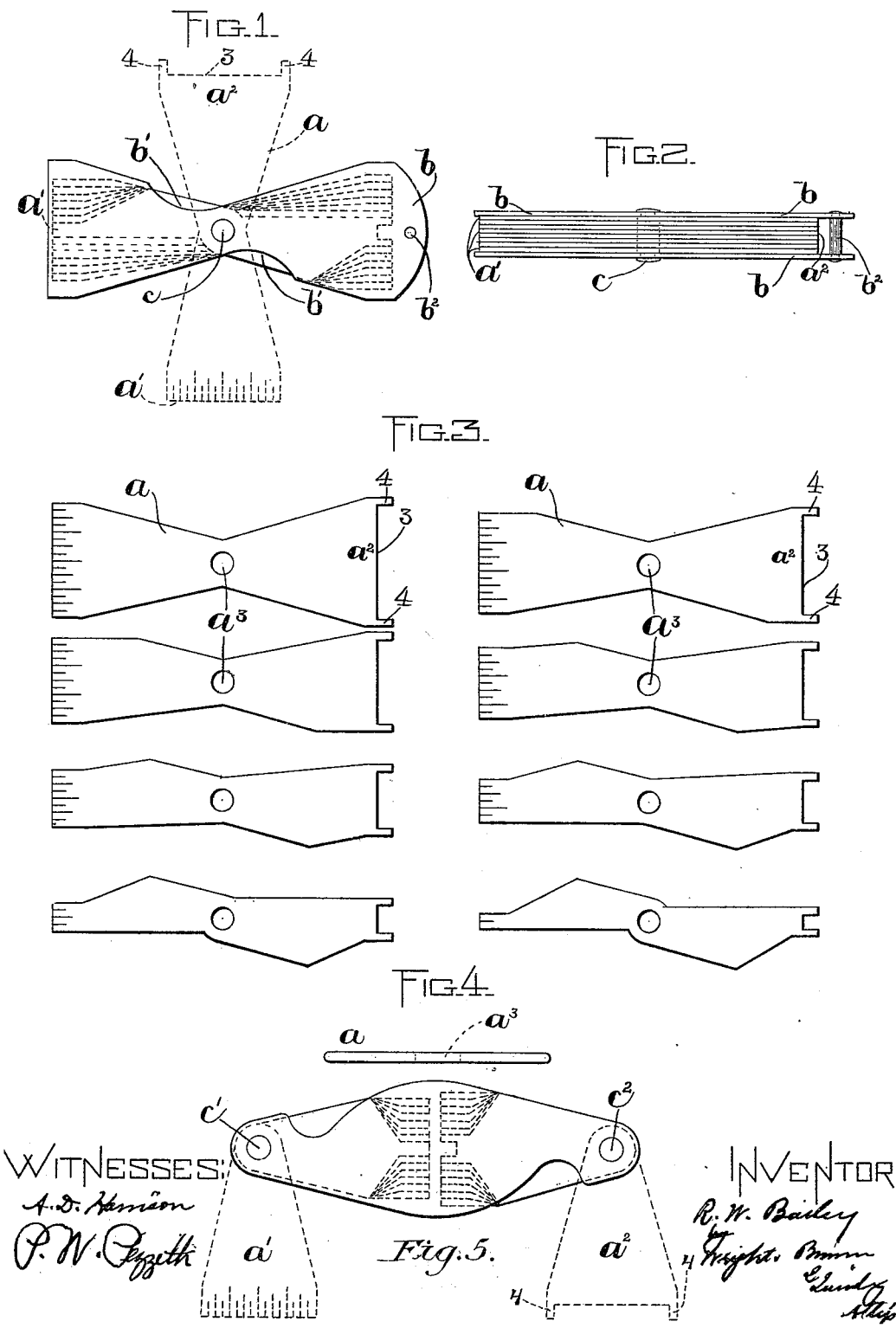

RALPH W. BAILEY, OF NEWBURY, MASSACHUSETTS.

MULTIPLE SCALE.

SPECIFICATION forming part of Letters Patent No. 644,756, dated March 6, 1900.

Application filed October 7, 1899. Serial No. 732,849. (No model.)

*To all whom it may concern:*

Be it known that I, RALPH W. BAILEY, of West Newbury, in the county of Essex and State of Massachusetts, have invented certain new and useful Improvements in Multiple Scales, of which the following is a specification.

This invention has for its object to provide in compact and convenient form a series of scale-plates comprising graduated scales of different lengths for measurements of various kinds required by machinists and a series of tongue-gages, each comprising two lips or projections separated by a space equal in length to one of the said graduated scales and adapted to serve as an inside caliper or as a means for accurately setting either inside or outside calipers.

The invention consists of the improvements which I shall now proceed to describe and claim.

Of the accompanying drawings, forming a part of this specification, Figure 1 represents a side view of my improved multiple scale, one of the scale-plates being shown by dotted lines in position for use. Fig. 2 represents an edge view of the same. Fig. 3 represents in separate views the series of scale-plates detached. Fig. 4 represents an enlarged end view of one of the plates. Fig. 5 represents a side view of a modification.

The same letters and numerals of reference indicate the same parts in all the figures.

In the drawings, $a\ a$ represent a series of scale-plates of oblong form and of uniform length. The end $a'$ of each plate is provided with graduations, said end constituting a graduated scale the edges of which are preferably rounded, as shown in Fig. 4, to enable the said end to be conveniently used in circular orifices as an inside caliper. The graduations are preferably provided on both sides of the plate, so that the device can be manipulated conveniently by either hand of the operator. The end $a^2$ of each plate presents an edge 3 and two projecting lips 4 4 at opposite ends of said edge, the space between said lips being equal to the length of the graduated scale. The end $a^2$, which I term a "tongue-gage," is thus adapted for use as an inside caliper to measure the length of enlargements on cylindrical pieces. It also constitutes a convenient means for accurately setting ordinary calipers of either the "outside" or the "inside" form. The width of the ends $a'\ a^2$ differs in each plate from all the other plates, as shown in Fig. 3. I prefer to employ eight plates, the graduated scale of the narrowest being one-eighth of an inch long, while the graduated scale of the widest is one inch long, there being one-eighth of an inch difference between each plate and the adjoining plate or plates.

$b\ b$ represent side pieces or covers, which support a pivot-stud $c$, on which the plates $a$ are mounted to swing independently, each plate having a stud-receiving orifice $a^3$ midway between its ends. The side pieces $b$ are formed to cover and protect practically all parts of the plates, recesses $b'\ b'$ being formed on the edges of said pieces to give access to the edges of the plates $a$ for the purpose of swinging them or either of them to the position of use shown by dotted lines in Fig. 1. The side pieces $b\ b$ are rigidly connected by a steady-pin $b^2$ to prevent either piece from swinging independently of the other on the pivot.

In Fig. 5 I show a modification in which the graduated scales and the tongue-gages are made as separate parts or plates, the plates having the graduated scales $a'$ being mounted to swing on pivot-studs $c'$, while the plates having the tongue-gages are mounted to swing on independent pivot-studs $c^2$.

I claim—

1. A multiple scale comprising a series of scale-plates mounted side by side on a pivot-stud on which each plate is adapted to swing independently, each plate having at one end a graduated scale and at the opposite end two projections separated by a space equal to the length of the said scale, the scale of each plate differing in length from the scales of all the other plates.

2. A multiple scale comprising a series of scale-plates mounted side by side on a pivot-stud on which each plate is adapted to swing independently, each plate having at one end a graduated scale and at the opposite end two projections separated by a space equal to the length of the said scale, the scale of each plate differing in length from the scales of all the other plates, and cover-plates connected with said pivots at opposite sides of the scale-plates, said cover-plates being rigidly connected with each other.

3. A scale-plate having at one end a graduated scale and at the other end two projections separated by a space of the same length as the said scale.

In testimony whereof I have affixed my signature in presence of two witnesses.

RALPH W. BAILEY.

Witnesses:
C. F. BROWN,
A. D. HARRISON.

It is hereby certified that the residence of the patentee in Letters Patent No. 644,756, granted March 6, 1900, upon the application of Ralph W. Bailey, for an improvement in "Multiple Scales," was erroneously written and printed "Newbury, Massachusetts," whereas said residence should have been written and printed *West Newbury, Massachusetts;* and that the said Letters Patent should be read with this correction therein that the same may conform to the record of the case in the Patent Office.

Signed, countersigned, and sealed this 17th day of April, A. D., 1900.

[SEAL.]

THOS. RYAN,
*First Assistant Secretary of the Interior.*

Countersigned:
C. H. DUELL,
*Commissioner of Patents.*